United States Patent [19]

Sherwood et al.

[11] Patent Number: 4,627,900

[45] Date of Patent: Dec. 9, 1986

[54] ELECTROCHEMICAL DISSOLUTION AND CONTROL OF NICKEL SULFIDE SCALE

[75] Inventors: William G. Sherwood; Paul B. Queneau, both of Golden; Jean-Paul Duterque, Arvada; Donald R. Hodges, Denver, all of Colo.

[73] Assignee: Amax Inc., Greenwich, Conn.

[21] Appl. No.: 412,056

[22] Filed: Aug. 27, 1982

[51] Int. Cl.[4] .............................................. C23F 13/00
[52] U.S. Cl. .................................... 204/147; 75/115; 204/141.5; 204/196; 423/146
[58] Field of Search ..................... 204/141.5, 147, 148, 204/149, 196, 197

[56] References Cited

U.S. PATENT DOCUMENTS

| | | | |
|---|---|---|---|
| 2,780,594 | 2/1957 | Dailey | 204/141.5 |
| 3,030,286 | 4/1962 | Tao | 204/141.5 |
| 3,102,086 | 8/1983 | Cotton | 204/148 |
| 3,239,440 | 3/1966 | Covington | 204/141.5 |
| 3,468,774 | 9/1969 | Kendall | 204/141.5 |
| 3,632,490 | 1/1972 | Covington | 204/141.5 |
| 3,795,597 | 3/1974 | Katz | 204/141.5 |
| 4,256,556 | 3/1981 | Bennett et al. | 204/147 |
| 4,345,981 | 8/1982 | Bennett et al. | 204/147 |

Primary Examiner—T. Tung
Attorney, Agent, or Firm—Michael A. Ciomek; Eugene J. Kalil

[57] ABSTRACT

A method for electrochemically minimizing sulfide scale buildup on a metal surface by connecting the surface as an anode and periodically reversing the current flow at predetermined intervals.

7 Claims, 3 Drawing Figures

ELECTROCHEMICAL DISSOLUTION AND CONTROL OF NICKEL SULFIDE SCALE

This invention relates to the dissolution and/or control of metal sulfide scale, e.g. nickel sulfide scale, in the precipitation of metal from sulfate solutions as a sulfide, such as dilute nickel-containing, sulfuric acid solutions obtained in the hydrometallurgical recovery of nickel and cobalt from lateritic ores.

STATE OF THE ART

In the hydrometallurgical recovery of nickel and cobalt from nickel laterite ores, the ore is high-pressure leached at an elevated temperature in an autoclave using sulfuric acid as the solvent for the contained nickel. Following dissolution of the nickel, the resulting pregnant liquor is separated from the leached ore and then neutralized to a pH conducive to the precipitation of nickel as nickel sulfide using $H_2S$ as the precipitating agent.

The process employed in the Moa Bay plant in Cuba is one of the few commercial operations in which nickel and cobalt are precipitated from acidic solutions.

Briefly, the Moa Bay process consists of neutralizing the pregnant liquor with lime (coral mud) to a pH in the range of about 2.2 to 2.5 and decanting the neutralized liquor which is then treated with hydrogen sulfide gas. The sulfide precipitation is carried out in a series of high-pressure autoclaves at a temperature of about 120° C. and a total pressure of about 150 psig. A choke controls the flow of the slurry from a high-pressure autoclave to a flash tank. A large amount of $H_2S$ gas is dissolved in the solution at the high pressure prevalent in the autoclaves and is released in the flash tank. This released gas, which is several times the amount actually consumed during precipitation, is washed, dried and compressed to high pressure prior to its recycle to the autoclaves. The slurry from the flash tank goes to a solid/liquid separation step (thickener). About two-thirds of the nickel sulfide leaving the reactor is returned to the process for recycling and the remaining one-third leaves as the product concentrates. The amount of solid recycle is proportioned to give about 20 gpl solids in the feed slurry.

The Moa Bay acid leaching process is disclosed in an article entitled "Acid Leaching Moa Bay-Nickel" by E. T. Carlson and C. S. Simons (Journal of Metals, March, 1960, pps. 206-213).

Another sulfide precipitation method is disclosed in U.S. Pat. No. 2,722,480 (Nov. 1, 1955). The method is particularly applicable in the treatment of nickel solutions resulting from the leaching of lateritic ore, such solutions generally containing 3 to 13 grams per liter (gpl) of nickel, 0.2 to 0.7 gpl Co, 0.5 to 2.0 gpl Fe++, 2 to 8 gpl Al, 1 to 5 gpl Mn, 0.5 to 2.0 gpl Mg and about 15 to 30 gpl $H_2SO_4$. The method comprises adjusting the free acid content of the solution to a pH of about 1 to 3, adding to the adjusted solution about 0.03 to about 10 gpl of finely divided metallic powder selected from the group consisting of Fe, Ni and Co and mixtures thereof, confining the solution at a temperature of about 60° C. to 90° C. under a positive over-pressure of hydrogen sulfide gas and continuing the treatment with agitation until sulfide precipitation substantially ceases. According to the patent, substantially all of the nickel (e.g. 98 to 99%) is precipitated by this method in about 1 to 2 hours.

Another sulfide precipitation process is that disclosed in U.S. Pat. No. 4,110,400. In this patent, a method is provided for efficiently precipitating nickel as nickel sulfide from a nickel sulfate solution containing about 1 to 40 gpl of nickel, for example, 3 to 15 gpl nickel, and optionally, cobalt. In its broad aspects, the method comprises providing said solution at a pH ranging from about 1.5 to 4 containing a soluble inert sulfate salt, e.g. magnesium sulfate, to provide sulfate ions as an acid buffer to combine with hydrogen ions formed during the precipitation of nickel. The reaction of the sulfate ions with hydrogen ions forms $HSO_4^{-1}$. If the solution has a pH below 1.5, the solution is then neutralized to a pH of about 1.5 to 4 by adding a neutralizing agent that forms a soluble inert sulfate salt by reaction with free sulfuric acid in the solution, the inert sulfate providing sulfate ions formed behaving as an acid buffer by combining with hydrogen ions formed during the precipitation of nickel sulfide to form $HSO_4^{-1}$. A slurry of finely divided nickel sulfide is then added to the buffered solution to provide a seed concentration of at least 75 gpl, following which the solution is subjected to sulfide precipitation with $H_2S$ under low pressure at a temperature of about 65° C. to less than about 100° C. while vigorously agitating said solution until substantially complete sulfide precipitation is obtained.

The autoclave vessels employed are made of titanium or titanium lined steel because of the resistance of titanium to sulfuric acid.

Generally speaking, metal sulfide scale (NiS) forms on the titanium surface exposed to the solution during the precipitation process and with time the scale builds up to thicknesses ranging from about 0.5 cm to 2 cm in about 30 days. Because of the scale formation, the operation must be interrupted in order to clean the autoclave surfaces mechanically which is tedious and time consuming.

It would be desirable to provide a process for easily removing the scale or inhibit the formation thereof on the solution-exposed surface of the autoclave.

OBJECTS OF THE INVENTION

An object of the invention is to provide an electrochemical method for removing sulfide scale from the surface of the precipitation vessel in which the sulfide precipitation is carried out.

Another object is to provide an electrochemical method for minimizing or inhibiting the formation of sulfide scale on the surfaces of the precipitation vessel.

These and other objects will more clearly appear when taken into conjunction with the following disclosure, the appended claims and the accompanying drawings, wherein:

SUMMARY OF THE INVENTION

Figure 1:
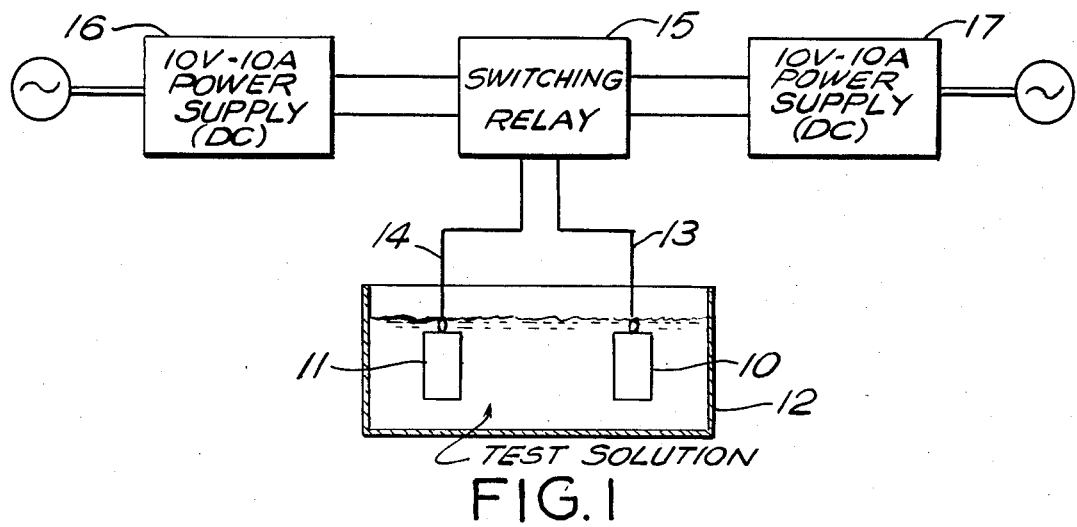
FIG. 1 is a schematic illustrating an electrochemical technique for dissolving metal sulfide scale.

In carrying out the invention, refractory $NiS_x$ scale is converted electrochemically to aqueous nickel sulfate while the scale is in contact with a dilute sulfuric acid solution (with or without nickel sulfate). The dilute solution may contain about 10 gpl to 100 gpl $H_2SO_4$. The process involves providing electrical contact between the scale and a direct current power supply. The opposite pole of the power supply is connected to an inert electrode immersed in the dilute sulfuric acid solution.

Thus, when the scale is made anodic, $S°$ and $Ni^{2+}$ form according to Reaction 1 as follows:

$$NiS \rightarrow S° + Ni^{2+} + 2e^- \tag{1}$$

Build-up of $S°$ is avoided by reversing the polarity for a predetermined period, which cathodically converts $S°$ to $H_2S$ (Reaction 2).

$$S° + 2H^+ + 2e^- \rightarrow H_2S \tag{2}$$

The NiS also reacts cathodically and is converted to $Ni°$ and $H_2S$ (Reaction 3).

$$NiS + 2H^+ + 2e^- \rightarrow Ni° + H_2S \tag{3}$$

Then when the scale is once again made anodic, the $Ni°$ oxidizes to $Ni^{2+}$ according to Reaction 4 below:

$$Ni° \rightarrow Ni^{2+} + 2e^- \tag{4}$$

Similar reactions apply to ZnS, CuS, PbS and CoS which are generally part of the scale. The invention is also applicable to non-stoichiometric sulfides of the general formula $MS_x$.

Where the walls of the autoclave are constructed of polarizable or film-forming metals, such as titanium, it has been found that polarizing the walls during or before precipitation of Ni with $H_2S$ prevents the formation of scale thereon during precipitation of NiS or other metal sulfide. Tests performed, using this technique, prevented or inhibited scale formation on polarized titanium surfaces, except at the air/solution interface within the precipitation vessel. The titanium showed neither pitting corrosion, nor weight loss.

The terms "polarizable" or "film-forming" metal are meant to include electrolyte-resistant metals which oxidize easily during electrolytic anodization, such as certain corrosion resistant stainless steels, titanium-group metals and niobium-group metals, among other electrolyte-resistant film-forming metals.

One embodiment of the invention resides in a method for electrochemically minimizing scale build-up of metal sulfide on the surface of an acid solution-resistant metal precipitation vessel, said solution-resistant vessel being formed of an electrochemically polarizable or film-forming metal, the method comprising, establishing an electrical circuit between the vessel and an inert electrode immersed in an acid solution contained in said vessel, passing a direct current from the vessel as the anode through the solution to the inert electrode in said solution, and then periodically reversing the current flow at predetermined intervals for a time sufficient to minimize build-up of sulfide scale on the surface of the vessel.

Another embodiment resides in a method for precipitating a metal sulfide in an acid solution-resistant vessel made of a polarizable or film-forming metal while minimizing scale build-up of metal sulfide on the surface of said vessel. The method comprises polarizing the vessel by making it an anode relative to an inert electrode immersed in an acid solution, said vessel containing metal sulfate precipitable as a metal sulfide. Polarization is achieved by passing a current from the vessel as an anode through the solution to the inert electrode, followed by precipitating the metal as a metal sulfide by adding a sulfur-containing precipitant to the solution, such that the build-up of metal sulfide scale $(MS_x)$ on the surface of the vessel during precipitation is greatly minimized in that the metal sulfide scale is immediately dissolved according to the chemical reactions discussed hereinbefore.

A still further embodiment is directed to a method for minimizing scale build-up of metal sulfide on the surface of an acid solution-resistant precipitation vessel made of an electrochemically polarizable or film-forming metal, said metal comprising, establishing an electrical current between the vessel as an anode having a metal sulfide scale on the surface thereof and an inert electrode immersed in an acid solution contained in the vessel, passing a direct current from the vessel as the anode through the scale and into the solution to the inert electrode, and then periodically reversing the current flow at predetermined intervals for a time sufficient to minimize scale build-up by effecting substantial dissolution of the metal sulfide scale.

The embodiments described hereinabove are particularly applicable to nickel-containing sulfuric acid solutions containing 10 gpl to 100 gpl $H_2SO_4$, the amount of nickel as nickel sulfate generally ranging from over about 2 gpl to about 20 gpl nickel.

DETAILS OF THE INVENTION

Tests have indicated that the periodic current reversal techniques using high current densities of over 1000 amps/sq. meter $(A/m^2)$ results in corrosion or dissolution of the scale at rates of about 2 to 3 cm/day in a sulfuric acid solution containing 90 gpl $H_2SO_4$. Since the corrosion or dissolution tends to produce crevices in the scale accompanied by extensive cracking, the indications are that the actual corrosion rate is very probably significantly greater due to spalling of the scale from the autoclave surfaces as the scale loses its integrity.

Test conducted on titanium samples using low current densities, e.g. ranging up to about 200 $A/m^2$ indicated scale formation is substantially completely inhibited on titanium oxide, even after several hours of continuous sulfide precipitation in a laboratory reaction. There was no evidence of corrosion of the titanium specimens. An advantage of this method is that downtime of the autoclave due to scale formation is reduced to a minimum. In some applications, this method may be preferred.

EXAMPLE

As illustrative of scale dissolution, two sulfide scale samples obtained from an autoclave precipitation system of a prototype plant were used as opposing electrodes. The two samples 10, 11 (note FIG. 1) were immersed in 500 ml of 90 gpl $H_2SO_4$ solution in vessel 12 and coupled via leads 13, 14 to a switching relay 15 which is coupled to two power supplies 16, 17 rectified from alternating current to provide a current flow of 10 amps at 10 volts. The power was alternately applied as direct current from each power supply (via timer-relay assembly 15 as shown) at frequencies ranging from about 10 seconds to 30 minutes.

Two tests were conducted at two current densities as follows:

| Test | Exposed Area (cm$^2$) | Current Density (amps/m$^2$) | Initial Wt. (g) | Final Wt. (g) | Scale Dissolution Rate (cm/day) |
|---|---|---|---|---|---|
| 1 | 13 | 7,700 | 60.7 | 40.7 | 2.5 |
| 2 | 6 | 3,500 | 42.8 | 32.8 | 2.7 |

(10 Amps; 30 Second Current Reversal; 25 Hours; 5–7 Volts; 90 gpl H$_2$SO$_4$; Ambient Temperature)

The data indicate that equivalent dissolution rates are obtained at 7700 and 3500 amps/m$^2$. This result suggests that equally high rates can be expected at lower current densities (and accordingly lower power consumption). Substantial crevice corrosion and cracking also occurred, thus suggesting that catastrophic sample fracture would eventually occur, producing much higher effective dissolution rates than those noted. Even then, the dissolution rates of 2.5 cm and 2.7 cm/day were quite substantial.

Figure 2:
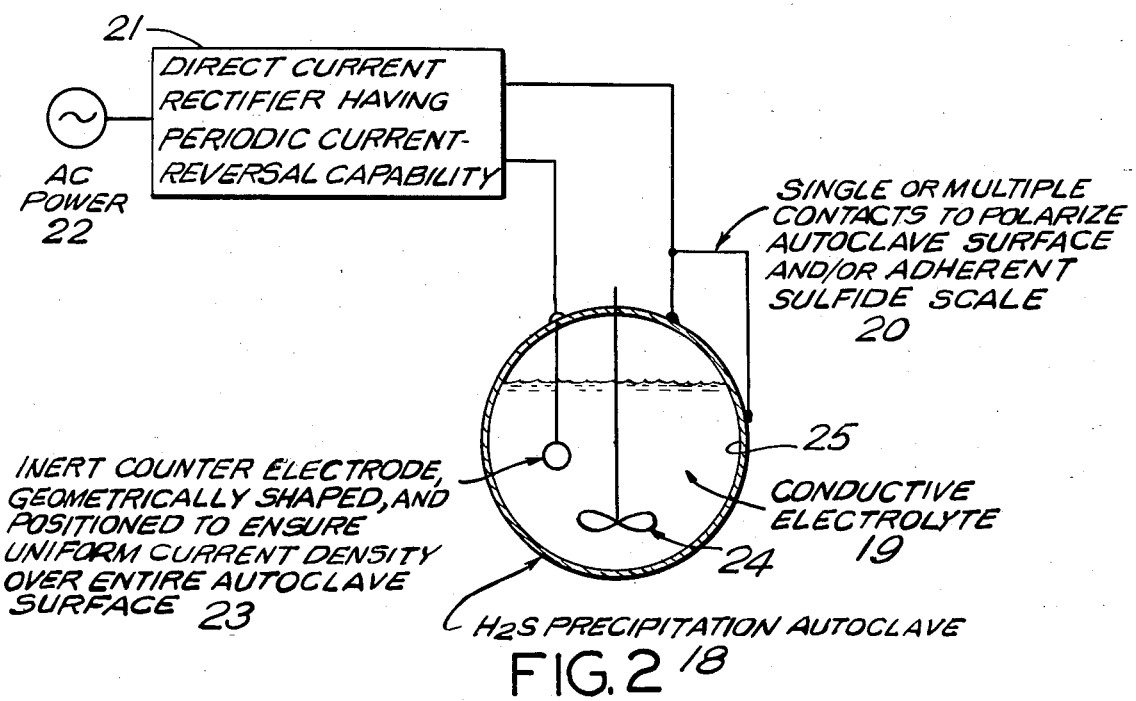
FIG. 2 is a schematic of an electrochemical system for minimizing scale build-up in an autoclave.

Referring to FIG. 2, a schematic is shown of an autoclave 18 made of titanium or other acid-resistant metal for effecting sulfide precipitation of a sulfide-forming metal ion, e.g., nickel, using H$_2$S as the precipitant, although other sulfur-containing reagents can be used. As described earlier, the precipitation is carried out at above atmospheric pressure and at an elevated temperature.

A pregnant liquor containing, for example, 15 grams per liter of nickel as nickel sulfate is fed into the autoclave which is referred to in FIG. 2 as a conductive electrolyte 19. The autoclave is coupled via single or multiple contacts 20 to a direct current rectifier 21 which in turn is coupled to an AC power source 22. A stirrer 24 is provided.

An inert counter electrode 23 is also provided immersed in the conductive electrolyte 19 which electrode in turn is connected to the opposite pole of the rectifier, the rectifier having current-reversal capability. As indicated on the drawing, the inert electrode is geometrically shaped to assure uniform current density over the entire inner surface of the autoclave in contact with the solution.

Where the metal of the autoclave is made of titanium, the flow of current from the autoclave into the solution and to the inert electrode during precipitation of metal sulfide results in an anodizing reaction at the solution-exposed surface 25 wherein a titanium oxide layer is formed which aids in substantially minimizing build-up of metal sulfide coating on the surface of the autoclave.

Figure 3:
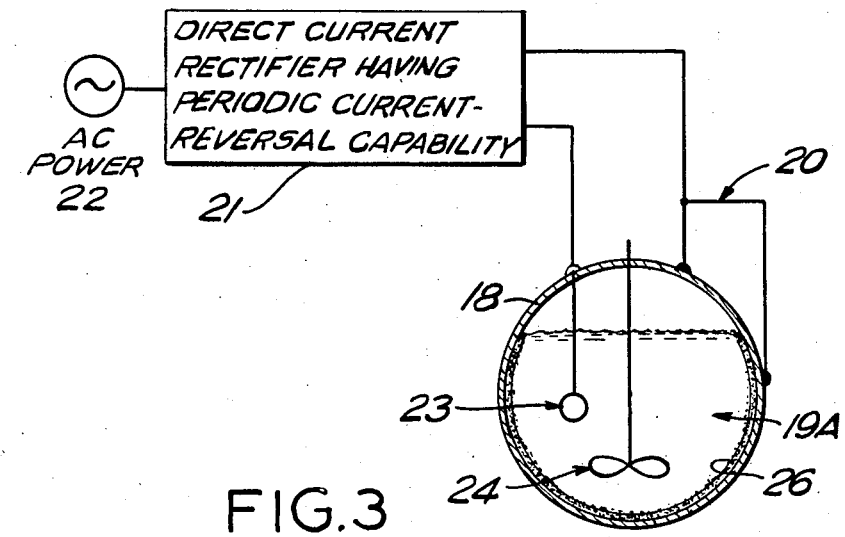
FIG. 3 is similar to FIG. 2 except that the autoclave is shown coated with a finite layer of metal sulfide, e.g., nickel sulfide.

On the other hand, in instances where the autoclave has a substantial build-up of metal sulfide scale 26 on the surface thereof as shown in FIG. 3, wherein the conductive electrolyte is dilute sulfuric acid 19A or any other acid or conductive electrolyte, the flow of current at relatively high current densities, as described in the example hereinabove, results in the dissolution of the metal sulfide scale. The reversal of current provides the desired chemical reactions wherein nickel sulfide is converted to ionic nickel and the sulfur to a form that enables it to combine with hydrogen ions to form H$_2$S, which is removed.

With regard to minimizing scale build-up in the embodiment involving the actual precipitation of metal sulfide, tests were conducted to determine the effects of polarizing the titanium vessel walls by simulation, using titanium rods or plates suspended in the nickel sulfate acid solution during precipitation of nickel sulfide using hydrogen sulfide as the precipitant.

Initial tests were performed using two 0.32 centimeter diameter rods through which a current density of 40 A/m$^2$ was applied (the solution-exposed rod was 13-cm long). The cell voltage increased from 4 to 20 volts within 12 minutes due to the oxide of the titanium anode.

After four precipitation runs (first cycle 160 minutes, subsequent cycles 60 minutes each, each with 1 liter of fresh nickel sulfate feed liquor charged at the start of each cycle) the precipitation autoclave was dismantled and the titanium rods were examined. The anodized titanium rod showed no signs of scaling (except at the solution-air interface), while the cathode and unpolarized autoclave parts were coated with up to 50 mm of scale. The autoclave was then reassembled without removal of the scale deposit, and a 90-minute precipitation test was performed with the polarity reversed (i.e. the "clean" anode was made the cathode and the scale-coated cathode was made the anode). Disassembly of the autoclave after the test indicated that the "new" anode was completely free of scale.

Two series of precipitation tests were then performed during which periodic current reversal was used. In the first series, at a current density of 80 amps/m$^2$, twelve batch precipitation tests were performed, the first for 90 minutes and subsequent tests for 60 minutes each. The current reversal time interval was 10 seconds. The titanium rod showed no scale deposits and no pitting corrosion or weight loss was noted.

The solution used in the foregoing tests contained about 8 gpl nickel and 30 gpl sulfuric acid. As stated hereinbefore, the pregnant leach liquor treated in the precipitation autoclaves may contain over about 2 gpl to about 20 gpl nickel as nickel sulfate. The acid content generally ranges from about 10 gpl to 100 gpl H$_2$SO$_4$.

The inert electrode used in carrying out the invention may be graphite or platinum. However, we prefer to use composite inert electrodes, wherein the substrates comprise a titanium-group, niobium-group, tungsten-group metals or alloys thereof coated with a platinum-group metal. A more preferred inert electrode would be the foregoing metal substrates coated with platinum-group metal oxides as disclosed in U.S. Pat. No. 3,711,385.

When polarizing the surface of the autoclave to minimize or avoid scale build-up on the surface exposed to the electrolyte, it may be desirable to place a reference electrode near the vessel wall to determine its potential before, during and after introduction of hydrogen sulfide. Examples of reference electrodes for this purpose are disclosed in U.S. Pat. No. 3,462,353, the disclosure of which is incorporated herein by reference. Of course, the inert electrodes disclosed in U.S. Pat. No. 3,711,385 mentioned hereinabove may be used for that purpose also.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method for electrochemically minimizing scale buildup of metal sulfide on the surface of an acid solution-resistant metal precipitation vessel, wherein said solution-resistant vessel is an autoclave formed of an electrochemically polarizable or film-forming metal, and wherein said metal sulfide is precipitated from a sulfuric acid solution containing metal sulfate by adding a sulfide-precipitating agent thereto, said method comprising, forming an electrical circuit between said autoclave and an inert electrode immersed in metal sulfate acid solution contained in said vessel, passing a direct current from said autocalve as the anode through said solution to said inert electrode in said solution such that anodically NiS is converted to $S°+Ni^{2+}+2e-$, and periodically reversing said current flow at predetermined intervals such that during cathodic treatment $NiS°+2H^++2e-$ is converted to $Ni°+H_2S$ and during anodic treatment $Ni°$ is converted to $Ni^{2+}+2e-$, the periodic reversal being repeated for a time sufficient to minimize build-up of sulfide scale on the surface of said autoclave during sulfide precipitation.

2. The method of claim 1, wherein said precipitation autoclave has a metal sulfide layer of nickel sulfide of finite thickness adhering to the surface thereof, wherein the solution is dilute sulfuric acid containing about 10 gpl to 100 gpl of $H_2SO_4$ and containing over about 2 gpl to about 20 gpl nickel as nickel sulfate, and wherein the periodic reversal of current is continued to effect substantial dissolution of said nickel sulfide scale on the surface of said autoclave and thereby minimize scale build-up.

3. The method of claim 1, wherein said autoclave is polarized during periodic reversal of current thereby minimizing scale build-up on the surface of said autoclave.

4. In a method for precipitating a metal sulfide in an acid-resistant autoclave made of a polarizable or film-forming metal while minimizing scale build-up of metal sulfide on the surface of said autoclave, the improvement which comprises, polarizing said autoclave by making it an anode relative to an inert electrode immersed in a sulfuric acid solution containing about 10 gpl to 100 gpl $H_2SO_4$ and containing metal sulfate precipitable as a metal sulfide by passing a current from said autoclave as an anode through said solution to the inert electrode, and precipitating said metal as a metal sulfide in said autoclave by adding a sulfur-containing precipitant to said solution, whereby the build-up of metal sulfide scale on the surface of said autoclave during precipitation is substantially minimized because of the polarization of the surface of said autoclave.

5. The method of claim 4, wherein the metal sulfate salt is comprised substantially of nickel sulfate and optionally minor amounts of other metal sulfates.

6. The method of claim 5, wherein the amount of nickel as nickel sulfate ranges from over about 2 gpl to about 20 gpl.

7. The method of claim 5, wherein the dissolution of the metal sulfide scale is effected on a titanium precipitation vessel having a scale of finite thickness thereon comprised substantially of nickel sulfide.

* * * * *